(12) United States Patent
Sasson et al.

(10) Patent No.: US 12,175,291 B2
(45) Date of Patent: Dec. 24, 2024

(54) RECYCLING CONTAINER STORAGE OBJECTS AT A STORAGE CONTROLLER

(71) Applicant: INTERNATIONAL BUSINESS MACHINES CORPORATION, Armonk, NY (US)

(72) Inventors: Ben Sasson, North Baddesley (GB); Lee Jason Sanders, Chichester (GB); Gordon Douglas Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 17/448,529

(22) Filed: Sep. 23, 2021

(65) Prior Publication Data
US 2023/0091573 A1    Mar. 23, 2023

(51) Int. Cl.
*G06F 9/50* (2006.01)
*G06F 12/02* (2006.01)

(52) U.S. Cl.
CPC .......... *G06F 9/5022* (2013.01); *G06F 9/5016* (2013.01); *G06F 9/5077* (2013.01); *G06F 12/0253* (2013.01)

(58) Field of Classification Search
None
See application file for complete search history.

(56) References Cited

U.S. PATENT DOCUMENTS

| 9,367,397 B1* | 6/2016 | Xie ..................... G06F 12/0261 |
| 10,747,452 B1 | 8/2020 | Sasson |
| 10,908,835 B1 | 2/2021 | Patel |
| 2019/0235605 A1 | 8/2019 | Chenchev |

(Continued)

FOREIGN PATENT DOCUMENTS

WO    2021033062 A1    2/2021

OTHER PUBLICATIONS

K. Suo, J. Son, D. Cheng, W. Chen and S. Baidya, "Tackling Cold Start of Serverless Applications by Efficient and Adaptive Container Runtime Reusing," 2021 IEEE International Conference on Cluster Computing (CLUSTER), Portland, OR, USA, 2021, pp. 433-443. (Year: 2021).*

(Continued)

*Primary Examiner* — Frank D Mills
(74) *Attorney, Agent, or Firm* — Teddi E. Maranzano

(57) ABSTRACT

Method and system are provided for recycling container storage objects at a storage controller. The method includes receiving a create operation of a new container by an orchestrator, including information indicating a purpose of the container, and associating a label with the new container, with the label indicating the orchestrator-defined information. The method includes checking labels of soft-deleted container objects for a suitable match with the label of the new container, where soft-deleted container objects are logical objects for deleted containers that are maintained for recycling. The method includes recycling metadata of a matched soft-deleted container object for the new container. The method includes checking received input/output operations for the new container against already stored data of the matched soft-deleted container to recycle data and skip writes where they match.

19 Claims, 11 Drawing Sheets

(56) References Cited

U.S. PATENT DOCUMENTS

| | | |
|---|---|---|
| 2019/0310968 A1 | 10/2019 | Attarde |
| 2019/0324987 A1 | 10/2019 | Kamath |
| 2020/0241754 A1* | 7/2020 | Bett ..................... G06F 3/067 |
| 2021/0055862 A1 | 2/2021 | Mulholland |
| 2021/0141760 A1* | 5/2021 | Li ..................... G06F 16/156 |
| 2021/0247906 A1* | 8/2021 | Sun ..................... G06F 11/1469 |

OTHER PUBLICATIONS

Mell et al., "The NIST Definition of Cloud Computing", Recommendations of the National Institute of Standards and Technology, Special Publication 800-145, Sep. 2011, 7 pages.
Pending U.S. Appl. No. 16/852,443, filed Apr. 18, 2020, entitled: "Stale Data Recovery Using Virtual Storage Metadata", 45 pages.
Pending U.S. Appl. No. 16/941,693, filed Jul. 29, 2020, entitled: "Deletion Of ovlumes in Data Storage Systems", 44 pages.

* cited by examiner

RECYCLING CONTAINER STORAGE OBJECTS AT A STORAGE CONTROLLER

BACKGROUND

The present invention relates to storage systems, and more specifically, to storage systems supporting container-based environments.

Modern storage systems often create and discard many objects. These objects consume space and discarding them allows the system to make use of the previously used capacity for other purposes. This process is known as garbage collection.

However effective, garbage collection costs the system in time, input/output operations per second, and other resources required to maintain and reclaim the reclaimable space. This can result in unexpected side effects such as performance degradation as a system fills up or applies out-of-space conditions, even when there is some reclaimable capacity in the system. In an environment that constantly creates this kind of reclaimable capacity, any reduction in the amount of garbage collection operations while keeping the system's capacity in check, will contribute to the overall health and performance of the system.

Storage systems being used to support container-based environment tend to be on the top level of this scale due to the way containers and microservices are used and deployed.

SUMMARY

According to an aspect of the present invention there is provided a computer-implemented method for recycling container storage objects at a storage controller, including receiving a create operation of a new container by an orchestrator, including information indicating a purpose of the container, associating a label with the new container, with the label indicating the orchestrator-defined information, checking labels of soft-deleted container objects for a suitable match with the label of the new container, where soft-deleted container objects are logical objects for deleted containers that are maintained for recycling, recycling metadata of a matched soft-deleted container object for the new container, and checking received input/output operations for the new container against already stored data of the matched soft-deleted container to recycle data and skip writes where they match.

According to another aspect of the present invention there is provided a system for recycling container storage objects at a storage controller, including a processor and a memory configured to provide computer program instructions to the processor to execute the function of the components: a create operation for receiving a create operation of a new container by an orchestrator, including information indicating a purpose of the container, a labeling component for associating a label with the new container, with the label indicating the orchestrator-defined information, a label comparing component for checking labels of soft-deleted container objects for a suitable match with the label of the new container, where soft-deleted container objects are logical objects for deleted containers that are maintained for recycling, a resurrecting component for recycling metadata of a matched soft-deleted container object for the new container, and an incoming input/output handling component for checking received input/output operations for the new container against already stored data of the matched soft-deleted container to recycle data and skip writes where they match.

According to a further aspect of the present invention there is provided a computer program product for recycling container storage objects at a storage controller, the computer program product including a computer readable storage medium having program instructions embodied within, the program instructions executable by a processor to cause the processor to: receive a create operation of a new container by an orchestrator, including information indicating a purpose of the container, associate a label with the new container, with the label indicating the orchestrator-defined information; check labels of soft-deleted container objects for a suitable match with the label of the new container, where soft-deleted container objects are logical objects for deleted containers that are maintained for recycling, recycle metadata of a matched soft-deleted container object for the new container, and check received input/output operations for the new container against already stored data of the matched soft-deleted container to recycle data and skip writes where they match.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided for delaying the actual deletion of container storage objects by soft-deleting storage objects to provide an opportunity to reuse a most fitting object skeleton and, where possible, recycle stored data. Storage objects are classified based on information of their creator and a label is kept and maintained post soft-deletion to allow the storage system to match incoming container creation operations to a most suitable soft-deleted storage object.

Generation metadata is known in garbage collection and is used to prevent the storage controller from retrieving old, invalid data. The described method may repurpose generation metadata to keep track of recycled data from soft-deleted storage objects.

Figure 1:
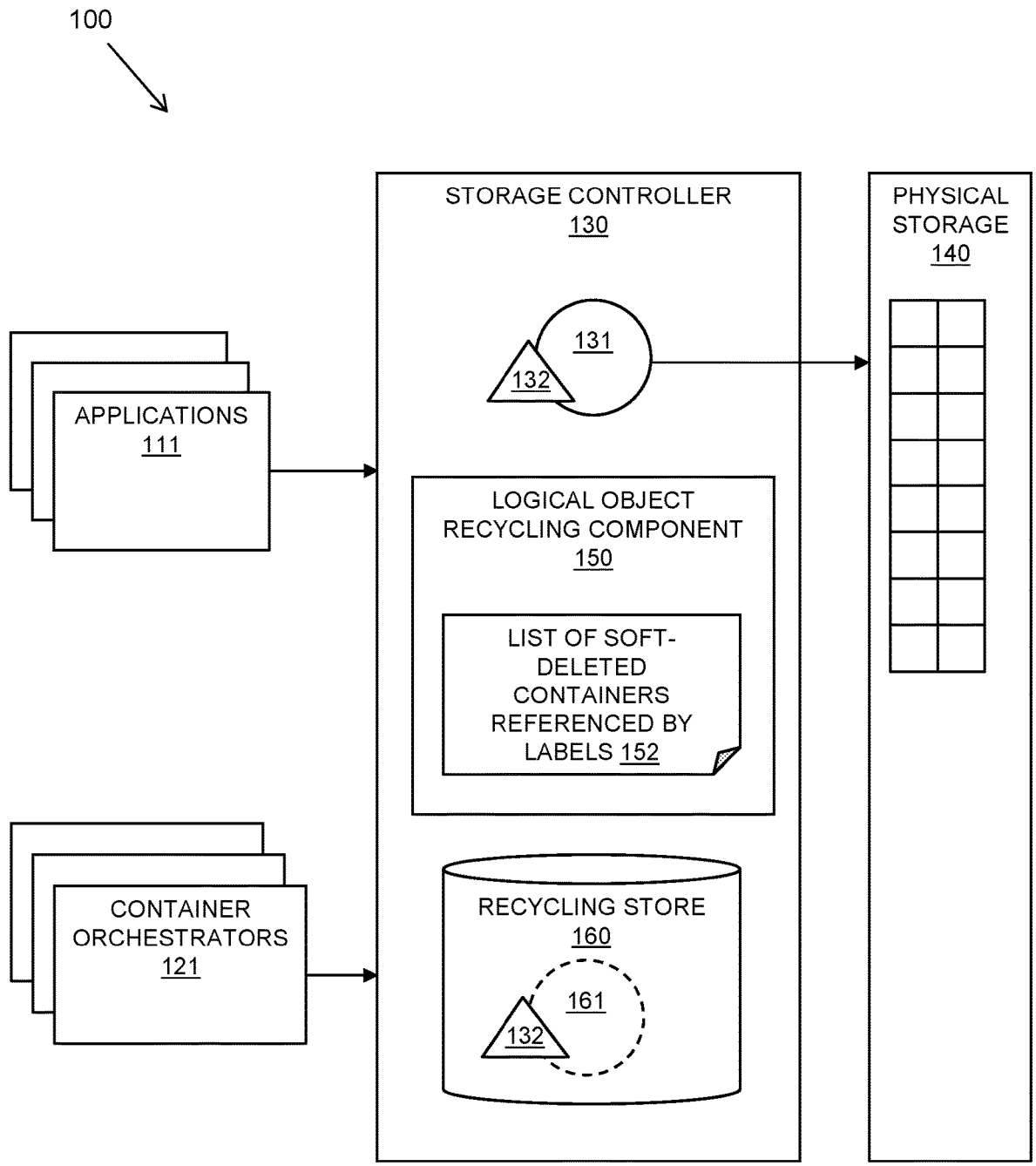
FIG. 1 is a schematic diagram of a storage system in which the described system may be implemented.

Referring to FIG. 1, a schematic diagram shows a container environment storage system 100 including a storage controller 130 providing virtualized storage management in front of physical storage 140. One or more container orchestrators 121 may create and delete containers at the storage controller 130 in the form of container storage objects including one or more logical objects 131 in the storage controller 130. Applications 111 may make input/output (IO) operations to the container logical objects 131 at the storage controller 130 which provides a logical-physical mapping to access data at the physical storage 140.

A container orchestrator 121 creates objects depending on an actual implementation (for example, volumes, containers, etc.) and the storage controller 130 translates this to create a storage object, typically a volume, to store data to be written to the created object by either the orchestrator 121 or the application 111. A logical object 131 includes metadata describing the translation of the logical to virtual addresses, used space, etc. A storage object refers to a logical object 131 at a storage controller 130 and stored data in the physical storage 140.

The described system provides a recycling store 160 for soft-deleted container logical objects 161 and a logical object recycling component 150 for referencing soft-deleted container logical objects 161 using a list 152 of soft-deleted containers each referenced by corresponding label 132.

When a container is created by a container orchestrator 121, the storage controller 130 provisions space for the container. The container orchestrator 121 may provide to the storage controller 130 information regarding a purpose of the new container used to classify the container according to its use or type. In the described method and system, the information is used to associate a label 132 with a container logical object 131 provisioned by the storage controller 130 for the new container. The label 132 may be provided by the container orchestrator 121 or added by the storage controller 130 based on information from the container orchestrator 131. The label 132 may including the container purpose information such as a kind or type of the container or an application expected to use the container, or a classification of the container. In the most simplistic form, the label 132 may be a tag in the form of an orchestrator image identifier of the container. The label 132 and generation information may be considered as meta-metadata as it describes the metadata of the container logical object 131 itself.

Upon creation of a new container, the logical object recycling component 150 of the storage controller 130 may check that the new container's label 132 matches labels 132 from the list 152 of soft-deleted containers in order to resurrect a soft-deleted container logical object 161 and recycle the metadata and data as a previous generation.

The described method allows the storage controller 130 to check incoming writes from applications 111 more efficiently against the already stored data and if matches are found (for example, operating system files), the storage controller 130 may skip the write of the data payload and send a reply to the host application 111.

By delaying the actual deletion of the container logical objects 131, an opportunity is provided to reuse a most fitting object skeleton.

Multiple generations of a logical object 131 may be stored associated with a same label 132. Existing data "generation" metadata may be repurposed for keeping track of the iteration of the logical object 131 used for different containers. This reduces the need to actually write data with the data being stored for longer periods.

The described method may be applied to a configured number of recent generations for a logical object 131, providing better garbage recycling and performance.

Figure 2:
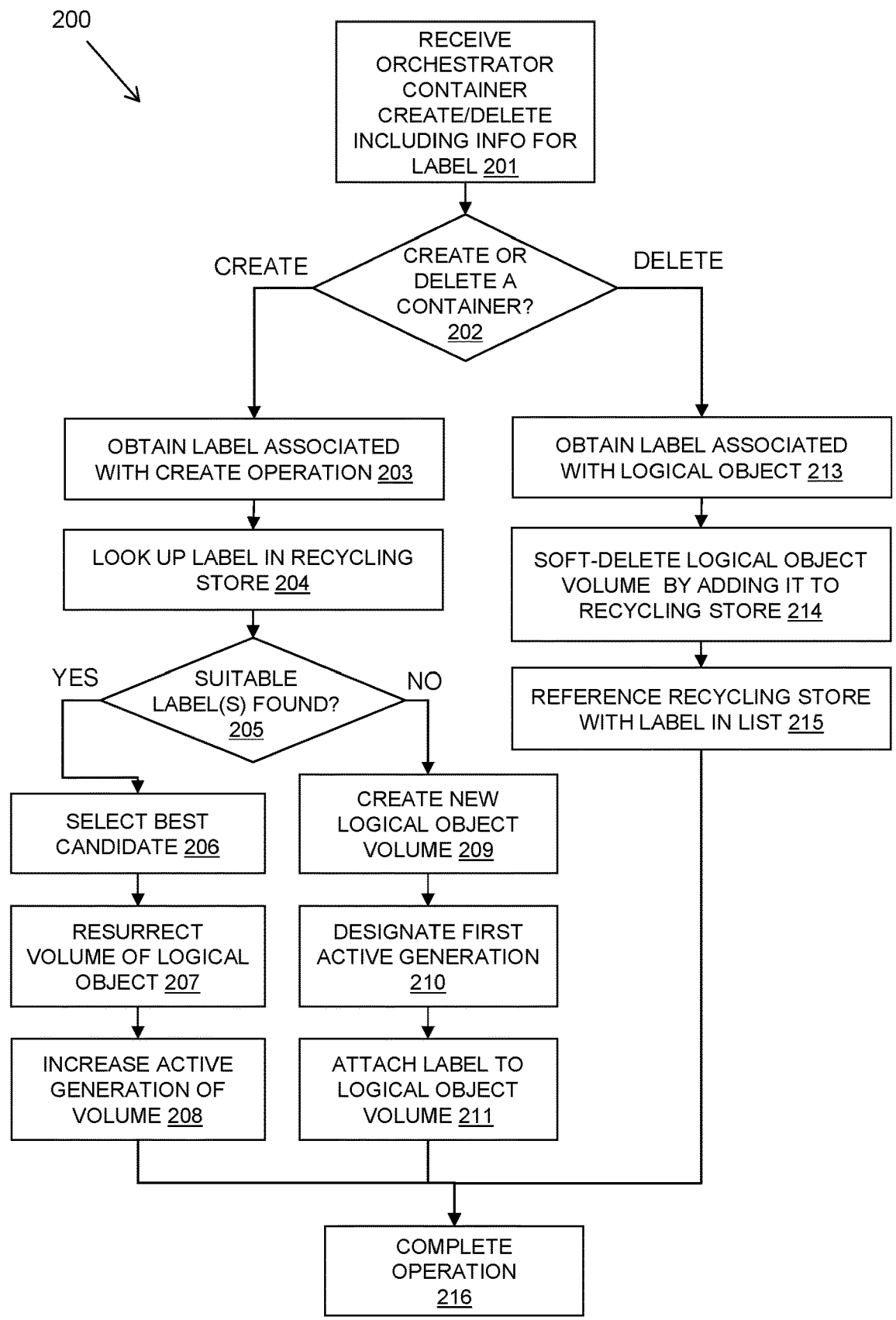
FIG. 2 is flow diagram of an example embodiment of an aspect of a method in accordance with the present invention.

Referring to FIG. 2, a flow diagram 200 shows an example embodiment of an aspect of the described method of volume management operations carried out by a storage controller 130. A container orchestrator 121 creates container objects as logical objects 131, depending on an actual implementation and the storage controller 130 creates a storage object, which is typically a volume, to store whatever data is going to be written to the object by either the orchestrator or an application.

The storage controller 130 may receive, 201, a create or delete operation of a container by a container orchestrator 121 and the operation may include information relating to the container. It may be determined, 202, if there is a create or delete operation.

For a create operation, the storage controller 130 may obtain, 203, a label 132 associated with the create operation. The label 132 may be based on information relating to the container provided by the orchestrator.

Next, the method may look up, 204, the label 132 in a recycling store 160 maintained for soft-deleted container logical objects 161. Then it may be determined, 205, if a suitable match for the label 132 is found.

If a suitable match for the label 132 is found, a best candidate may be selected, 206. Then a volume of a logical object 131 having the selected label 132 may be resurrected, 207, and then an active generation of the volume may be increased, 208, in associated generation metadata. This may indicate that a new use of the logical object 131 is being made for a new container. The create operation may then complete, 216.

If a suitable matching label 132 is not found, a new logical object 131 volume may be created, 209, and the associated generation metadata may be designated, 210, as a first active generation. A label 132 is then attached, 211, to the new volume as obtained at 203 from the orchestrator create operation. The create operation may then complete 216.

In the event that it is determined, 202, that the operation is to delete a container, the method may obtain, 213, a label 132 associated with the delete operation. The label 132 may be based on information relating to the container provided by the orchestrator. The method may then soft-delete, 214, a logical object volume of the container by adding it to the recycling store 160 and referencing, 215, it by the label 132 in a list 152 maintained by the storage controller 130. The delete operation may then complete 216.

Figure 3:
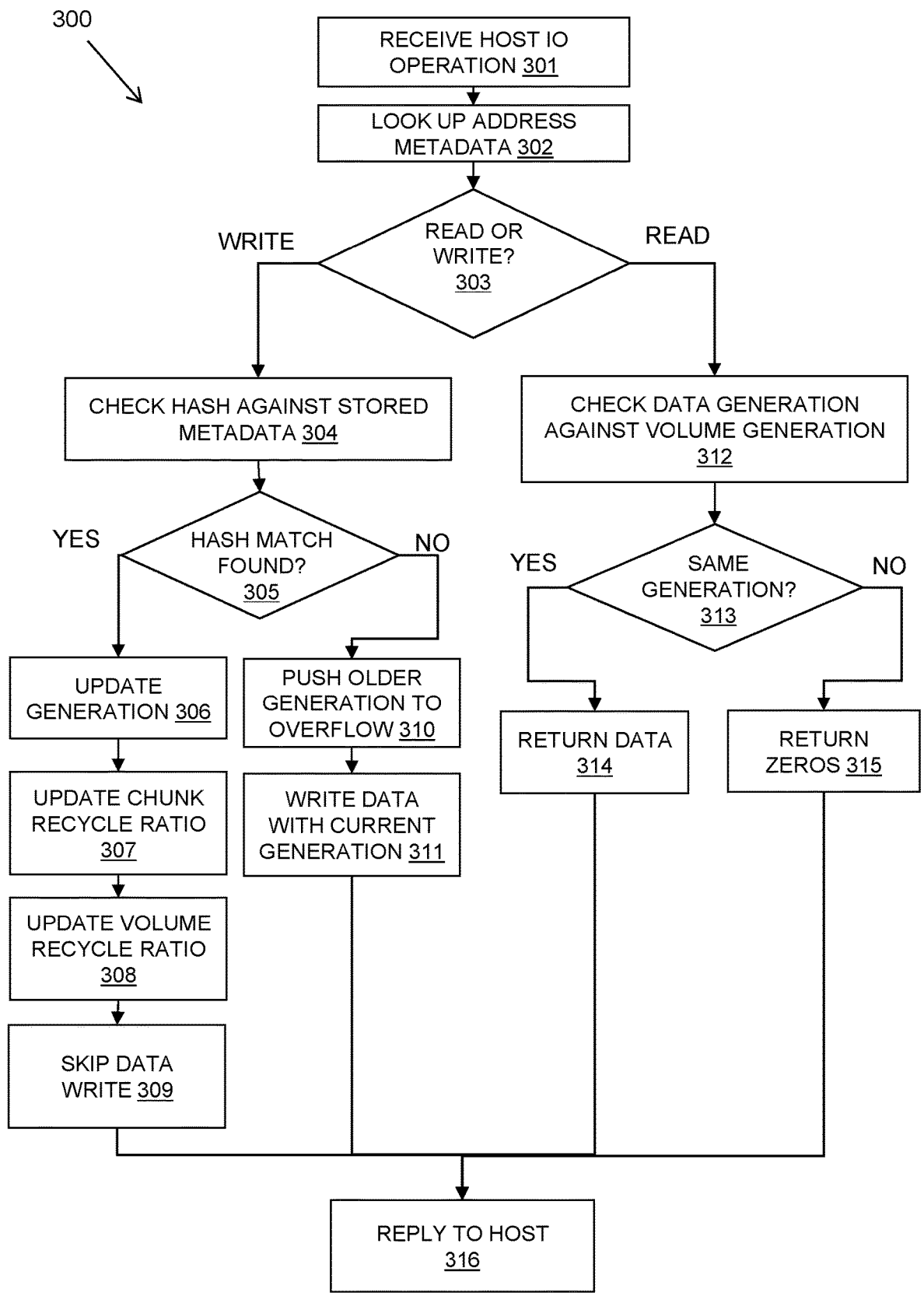
FIG. 3 is a flow diagram of an example embodiment of another aspect of a method in accordance with the present invention.

Referring to FIG. 3, a flow diagram 300 shows an example embodiment of an aspect of the described method of processing host 10 operations at the storage controller 130.

A host 10 operation is received, 301, at the storage controller 130 and then a corresponding metadata address may be looked up, 302. Next, it is determined, 303, if the operation is a read or a write operation.

If the operation is a write operation, the method may check, 304, a hash of the new write operation against a hash stored in the metadata for a previous generation of the logical object 131. Then it is determined, 305, if a match is found.

If there is a hash match at 305, the method may update the generation, 306, and skip, 309, the data write. Next, the method may also update, 307, the chunk recycle ratio and update, 308, the volume recycle ratio for managing the recycling store as described further below. Then, a reply may be sent, 316, to the host.

If there is not a hash match at 305, the method may push, 310, the older generation to overflow, 310, and may write, 311, the data with a current generation. A reply may be sent, 316, to the host.

If the operation is a read operation, the method may check, 312, the data generation against a volume generation. If it is the same generation, 313, the method may return, 314, the data. If it is not the same generation, the method may return, 315, zeros. A reply may be sent 316 to the host.

Referring to FIGS. 4A to 4D, schematic diagrams 410, 420, 430, 440 illustrate an example embodiment of the described method and system. The diagrams show one or more container orchestrators 121 that instruct 402 create/delete operations of containers at the storage controller 130 and applications 111 that make application IO 401 to containers at the storage controller 130.

Figure 4A:
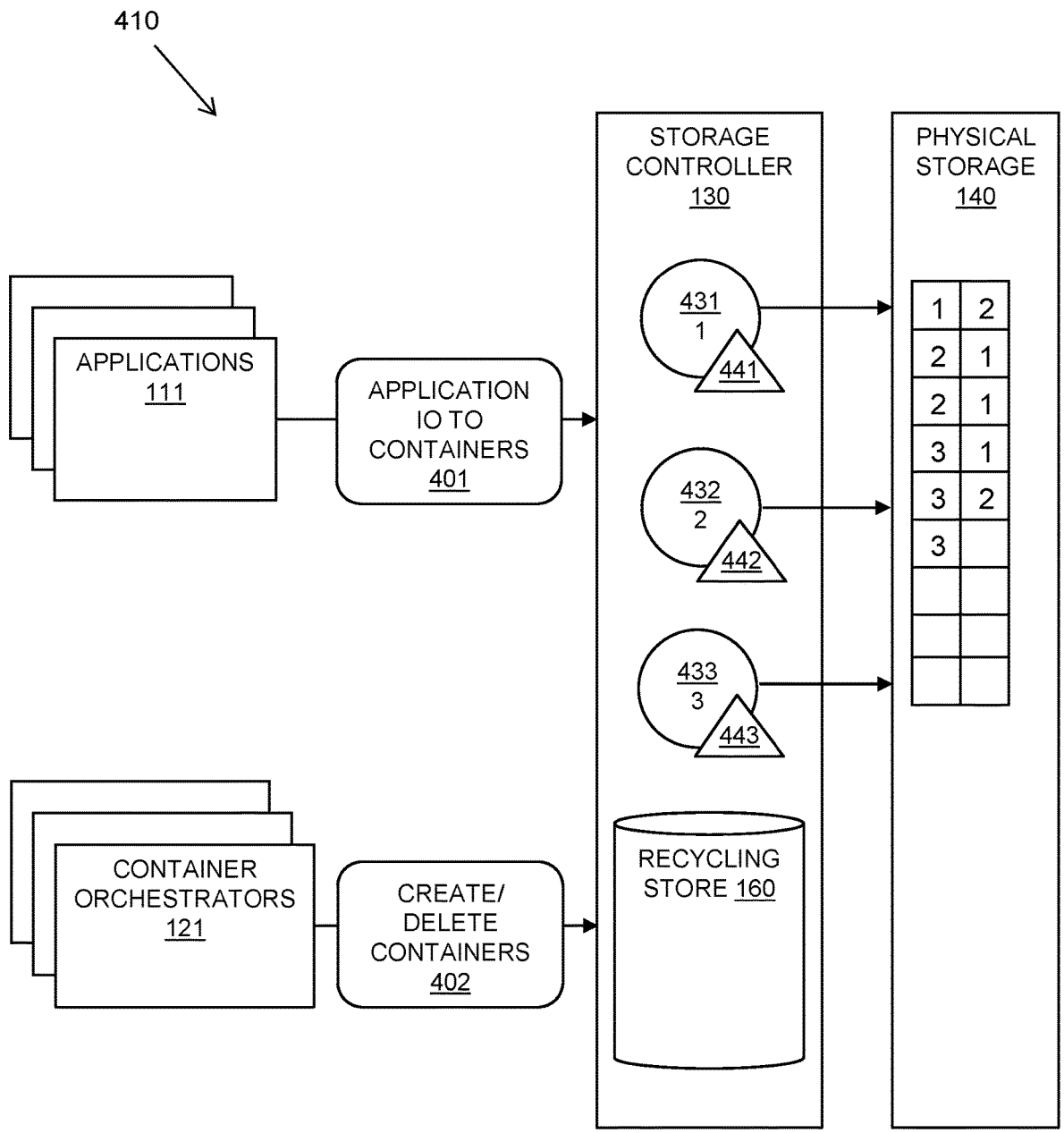
FIGS. 4A to 4D are schematic diagrams showing an example embodiment of the method in accordance with the present invention.

Referring to FIG. 4A, the diagram 410 shows created container logical objects 1, 2, 3 431-433 with logical-physical mappings to physical storage 140 addresses. Each container logical object has an orchestrator-defined label 441-443 that tells the storage controller 130 about the container, such as what kind of container it is or what application expected to use the container.

Figure 4B:
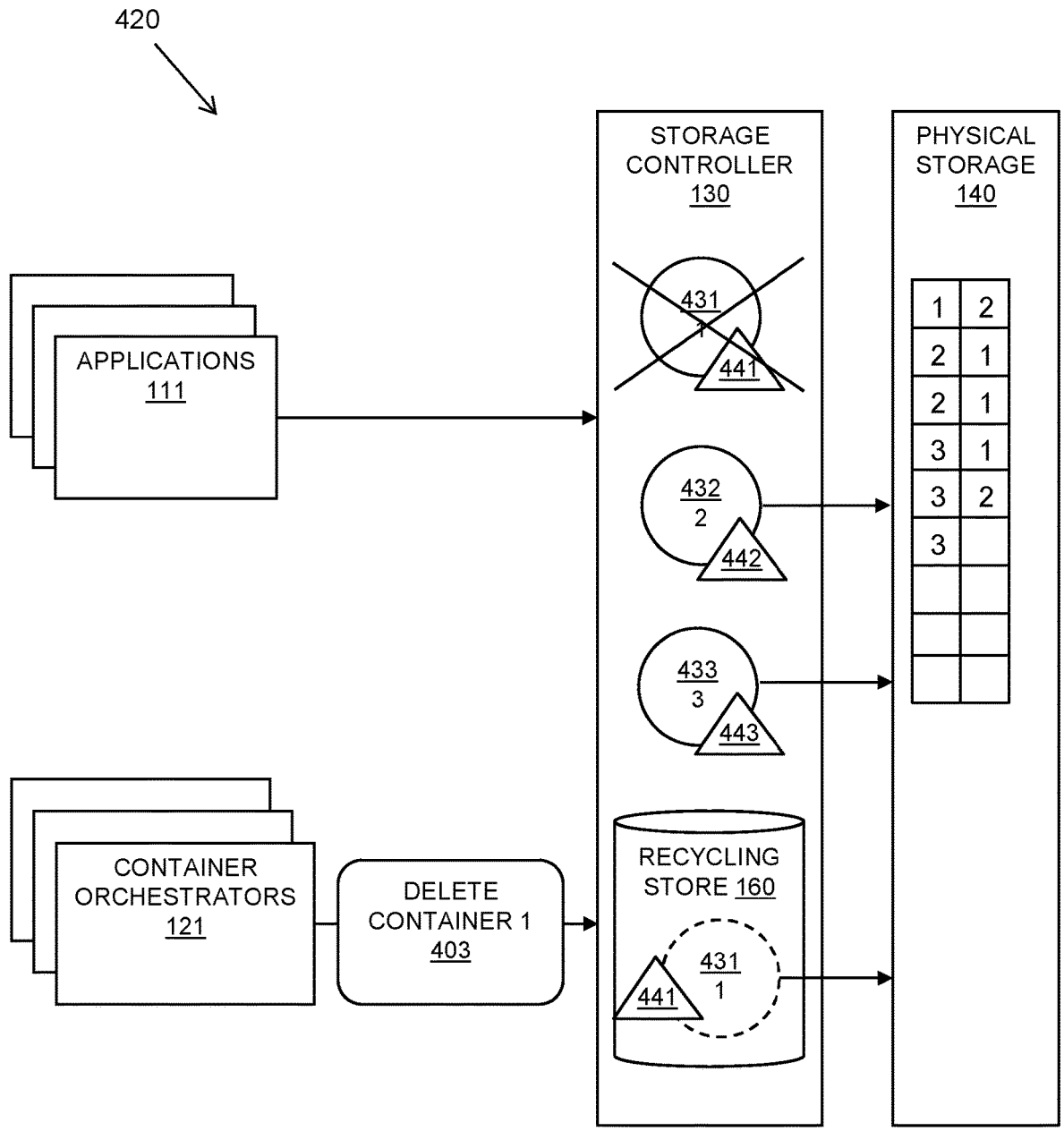

Referring to FIG. 4B, the diagram 420 shows an operation 403 from a container orchestrator 121 to delete container 1 431. The container logical object 1 431 is soft-deleted and moved to the recycling store 160 referenced by its label 441. When a container is soft-deleted, instead of invalidating the data via a background delete, the system marks it as "inaccessible" and references it in the recycling store 160. Data is still valid and can be referenced if needed from the metadata.

Figure 4C:
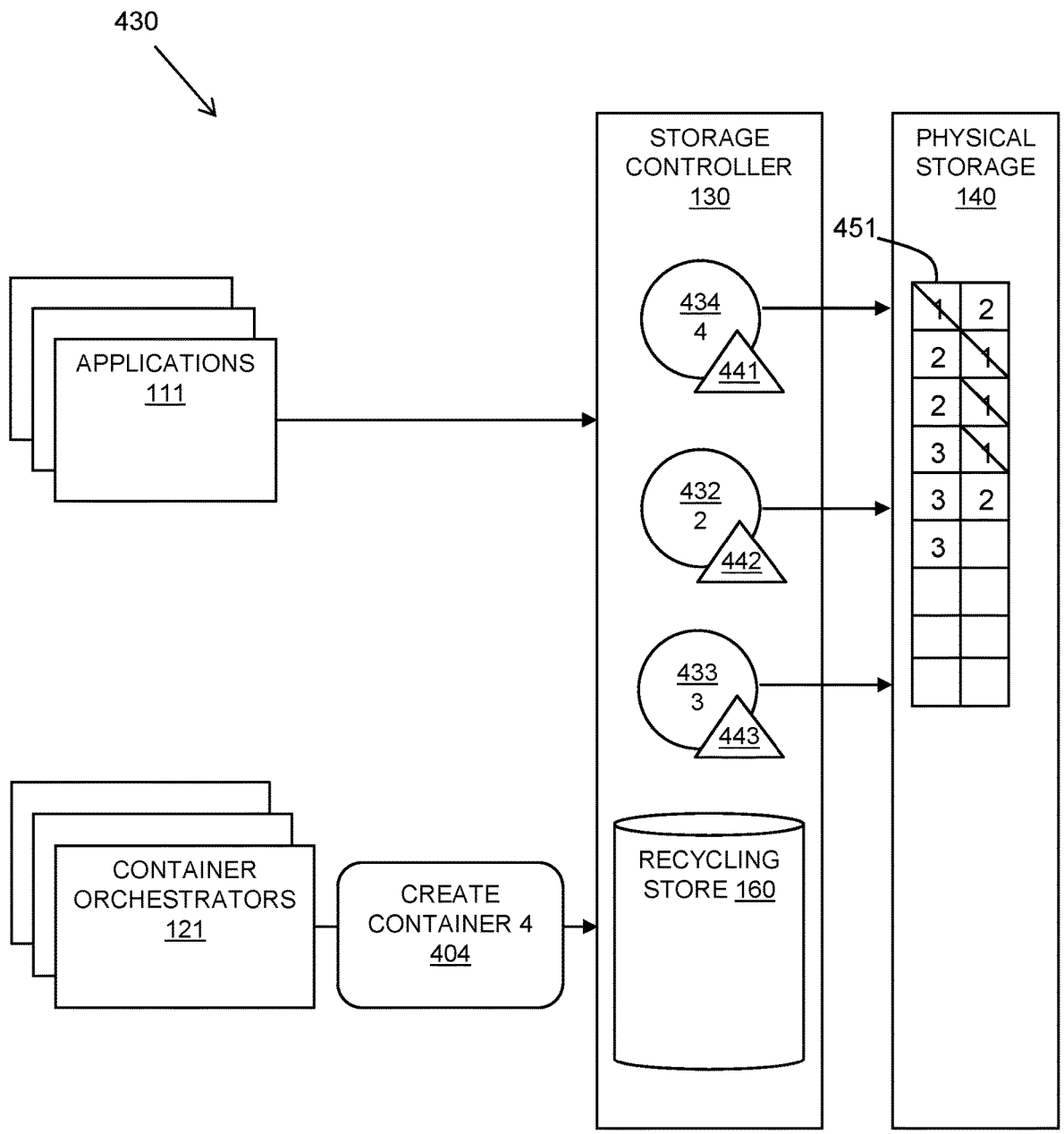

Referring to FIG. 4C, the diagram 430 shows an operation 404 from a container orchestrator 121 to create container 4 434. A new container logical object 4 434 is created with a label 441 based on the new container's operation. On container create 402, the new label 441 used in the create command is checked against the recycling store 160 to find a best recycling candidate. The new label 441 matches the label 441 of the soft-deleted container 1 431. The soft-deleted container logical object 431 is resurrected and moved back to the active area as the new container logical object 434. The data 451 mapped to in the physical storage 140 is considered inaccessible as it belongs to a previous generation at this point.

Figure 4D:
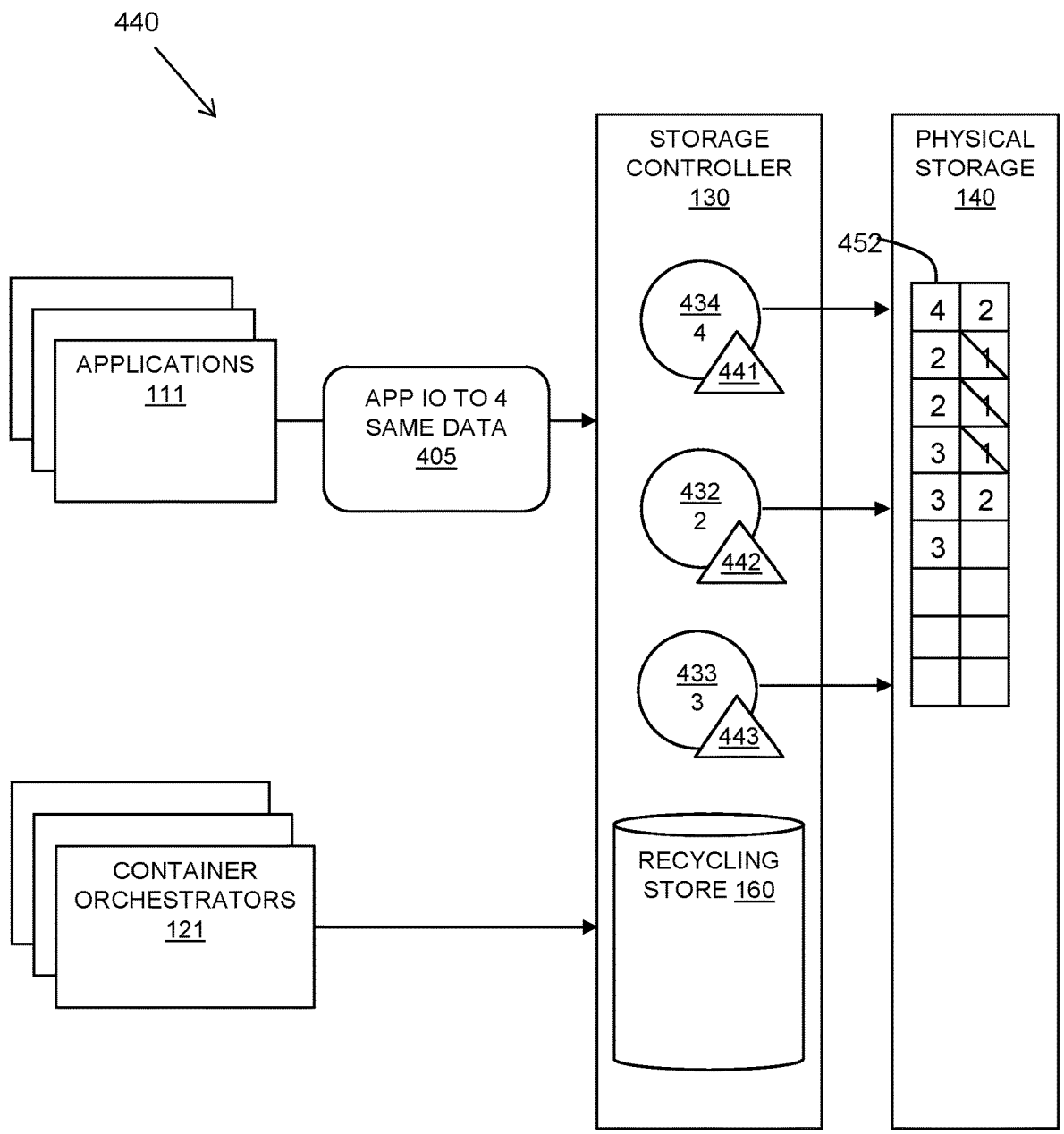

Referring to FIG. 4D, the diagram 440 shows a write operation 404 from an application 111 to container 4 434. Hashes are used to establish identity with previously written data 451 (in FIG. 4C). If the hash matches, the data is recycled and metadata updated to the present generation 452 and the write does not take place.

In a conventional method, when a volume is deleted, the associated physical storage 140 is invalidated as well as the metadata structure to carry out background delete/deallocation, which takes time and resources from the system. The system works through invalidated data to reclaim it and free the space for reuse in the future. This process further takes resources from the system as data has to be moved around and metadata structures updated. When a new volume is created to serve a same purpose (for example, when a container is re-spun in response to load), this new volume will have at least initially a lot in common with the previous instance (for example, the operating system). These typical systems therefore waste resources responding to writes for data that was previously written there.

The described method and system provide advantages by the container orchestrator 121 informing the storage controller 130 what kind of container or application is expected to use it (orchestrator defined). When a container is deleted, instead of invalidating the data via background delete, the system marks it as "inaccessible" and references it in a recycling store or warehouse. Data is still valid and accessible and can be referenced if needed from the metadata.

The use of generations metadata of container logical objects 131 keeps track of data that has been matched or written for a new generation of container. If a write is identical, the system will update the generation of the address in the metadata and skip the write, otherwise write the new data, and update metadata. Multiple generations may be associated with same label 132, further reducing the need to actually write data at the expense of data stored for longer periods. However, the system can push back on that in case of space pressure.

As an additional aspect, a higher level of deduplication lookup may be provided. Usually when referring to deduplication, a relatively small area (kilobytes or megabytes, etc.) is used. However, in the described method, the label 132 provides a hint to the storage controller 130 for a higher level of deduplication. For example, if the label 132 can tell the storage controller 130 that an object is a machine of a certain type, then when another machine of the same type is created it is almost guaranteed that they will share a lot of the data in common. This allows the storage controller 130 to perform another level of deduplication lookup by looking at other volumes sharing the same label 132 before checking the main deduplication hash database.

In the presence of global deduplication, a precursory layer of duplicate resolution may be created that is much more efficient than searching for the presence of a data value in a "global" dictionary due to both the smaller scope of the data dictionary for a label and the ability to use address affinity of standard system files being accessed in repeated container-image resurrection and operation across generations.

As a further additional aspect, a metadata structure may be provided to re-order generations based on the recycling of write data in order to find write matches more quickly. The metadata structure may store a value called "chunk recycle ratio" per chunk generation. This value may be incremented when a chunk is resurrected and can be used to re-order the generations (generations order does not matter anymore once deleted as it is all garbage) to try and have recycling scanning finding matches earlier.

If a chuck was deleted and resurrected multiple times, this indicates that it is important or heavily used. By applying this ratio to a volume (for example, a volume has 100 chunks out of which 50 were resurrected), this can be used by the system to understand which objects are more worthwhile to keep for longer periods in the recycling store and/or in the presence of multiple identical labels in the recycling store which one is more worth resurrecting.

The system cannot store soft-deleted volumes and their data indefinitely as it will run out of space and will eventually need to select a volume held in the recycling store for actual deletion and garbage collection. To make sure the right volume is selected, various techniques may be implemented. In one example, an algorithm may calculate a "volume recycle ratio" that will be used to order volumes in the recycling store as a means to select the best candidate for garbage collection (for example, a lowest recycle ratio).

Figure 5:
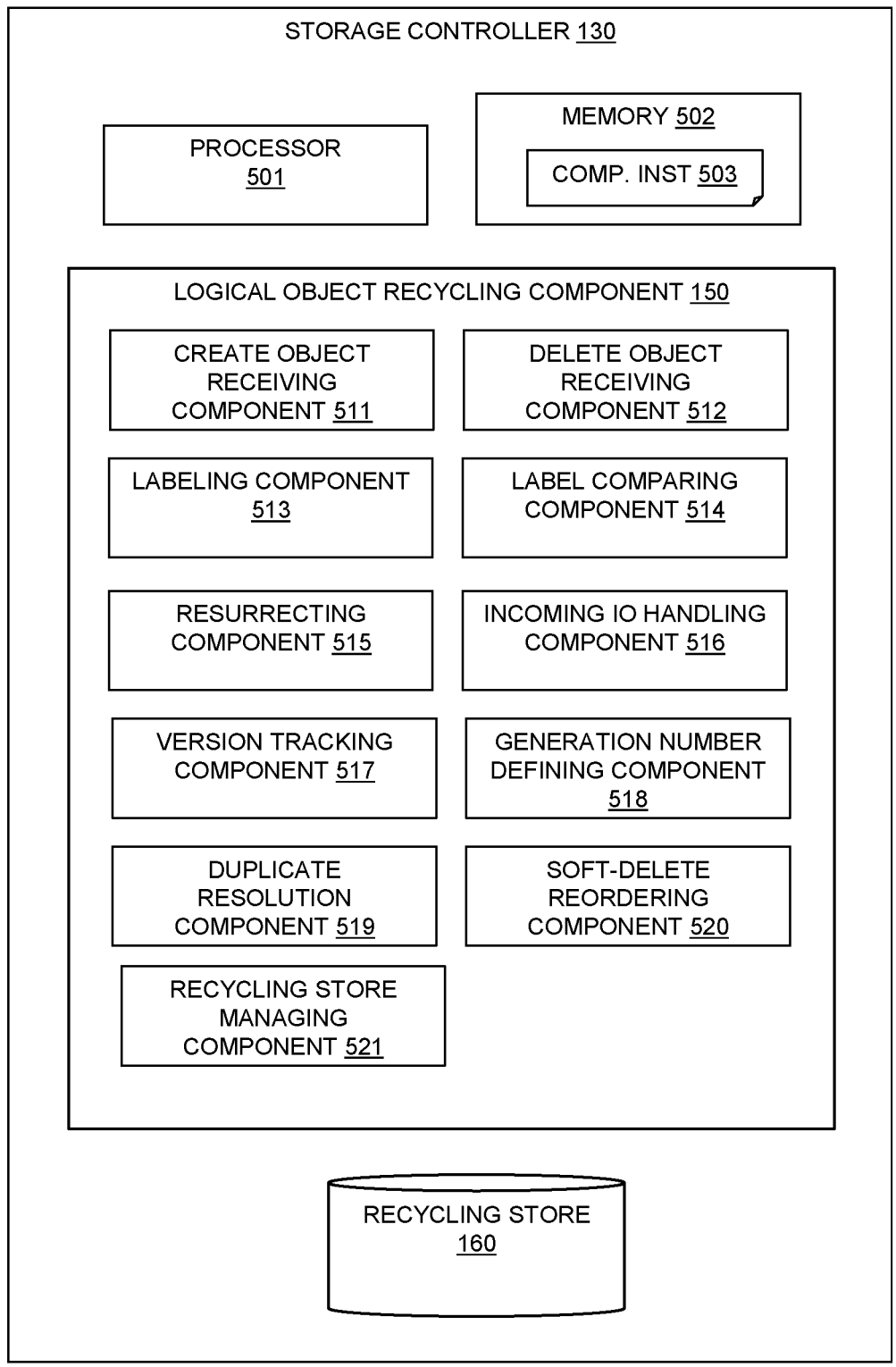
FIG. 5 is block diagram of an example embodiment of a system in accordance with the present invention.

Referring to FIG. 5, a block diagram shows a storage controller 130 at which the logical object recycling component 150 may be provided.

The storage controller 130 may include at least one processor 501, a hardware module or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The logical object recycling component 150 may include a create operation receiving component 511 for receiving a create operation of a new container by a container orchestrator 121 including information used to generate a label 132 indicating a purpose of the container and for creating a new logical object 131 with the orchestrator-defined label 132 if no suitable match of a soft-deleted container is available. The logical object recycling component 150 may include a labeling component 513 for associating a label with the new container, with the label 132 indicating the container orchestrator 121—defined information. The logical object recycling component 150 may also include a delete operation receiving component 512 for receiving a delete operation of a container by a container orchestrator 121 and soft-deleting a container by moving a logical object 131 for the container to a recycling store 160 referenced by the label 132 associated when the container was created.

The logical object recycling component 150 may include a label comparing component 514 for checking labels of soft-deleted container objects for a suitable match with the label 132 of the new container, where soft-deleted container objects are logical objects 131 for deleted containers that are maintained for recycling and a resurrecting component 515 for recycling metadata and data of a matched soft-deleted container object for a new container.

The logical object recycling component 150 may include a version tracking component 517 for tracking a version of the logical object 131 using generational garbage collection metadata. The logical object recycling component 150 may also include a generation number defining component 518 for defining a number of recent generations of the logical object referenced by a common label.

The logical object recycling component 150 may include an incoming Input/Output handling component 516 for checking received IO operations for the object against already stored data of the matched soft-deleted container to recycle data and skip writes where they match. The incoming IO handling component 516 may check incoming IO operations including checking a write hash against stored metadata for a previous generation of the same container: if a match is found, skipping the data write and updating a generation of the address in the metadata; and, if no match is found, writing the data and updating the metadata generation.

The logical object recycling component 150 may include a duplicate resolution component 519 for providing a higher level of deduplication lookup by looking at storage volumes sharing a same label before checking a deduplication hash database.

The logical object recycling component 150 may include a soft-delete reordering component 520 for providing a metadata structure to re-order generations based on the recycling of write data in order to find commonly recycled data.

The logical object recycling component 150 may include a recycling store managing component 521 for selection of soft-deleted containers for actual deletion and garbage collection of soft-deleted logical objects based on a lowest volume recycling metric.

Figure 6:
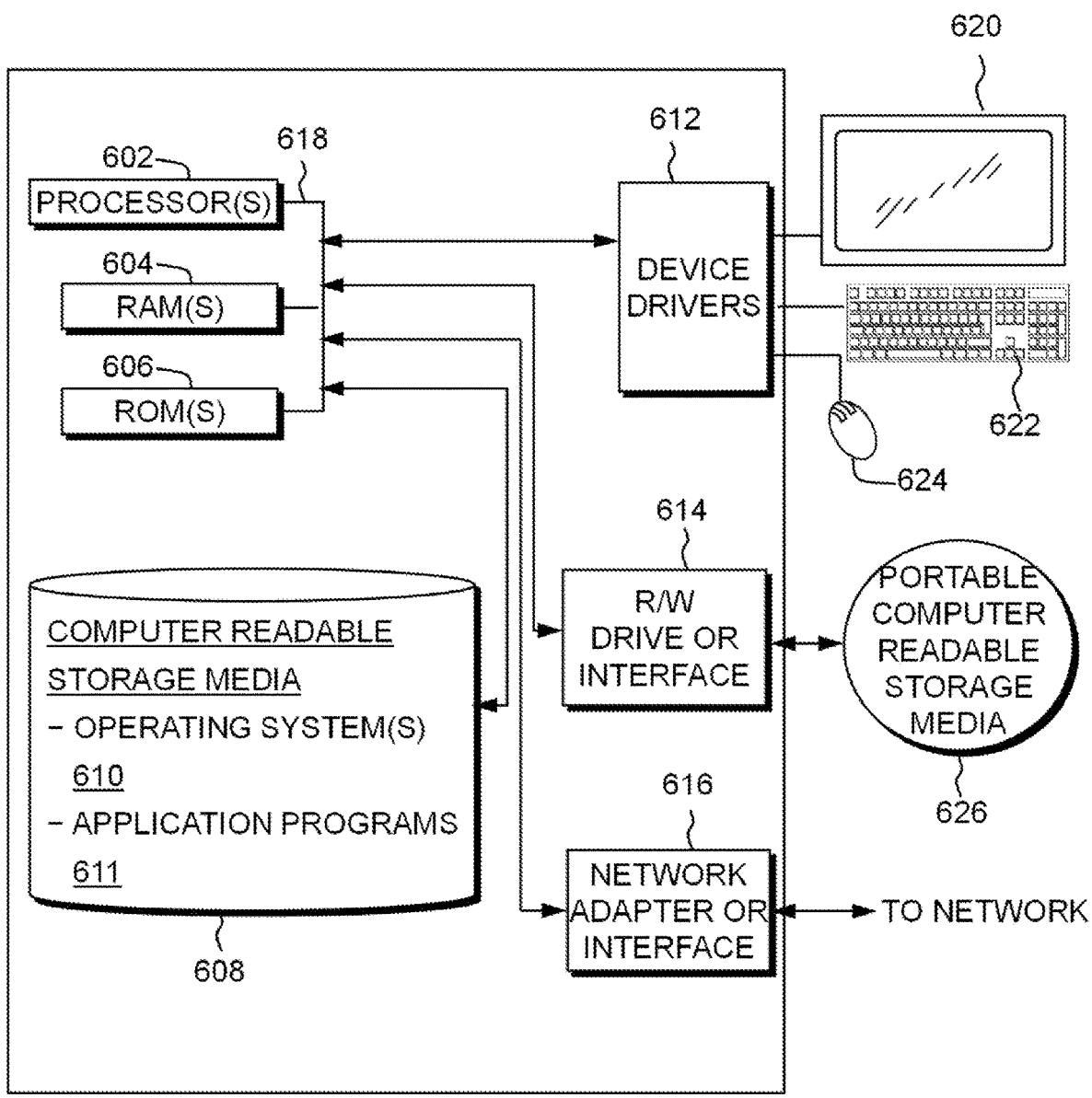
FIG. 6 is a block diagram of an embodiment of a computer system or cloud server in which the present invention may be implemented.

FIG. 6 depicts a block diagram of components of a computing system as used for the storage controller 130, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
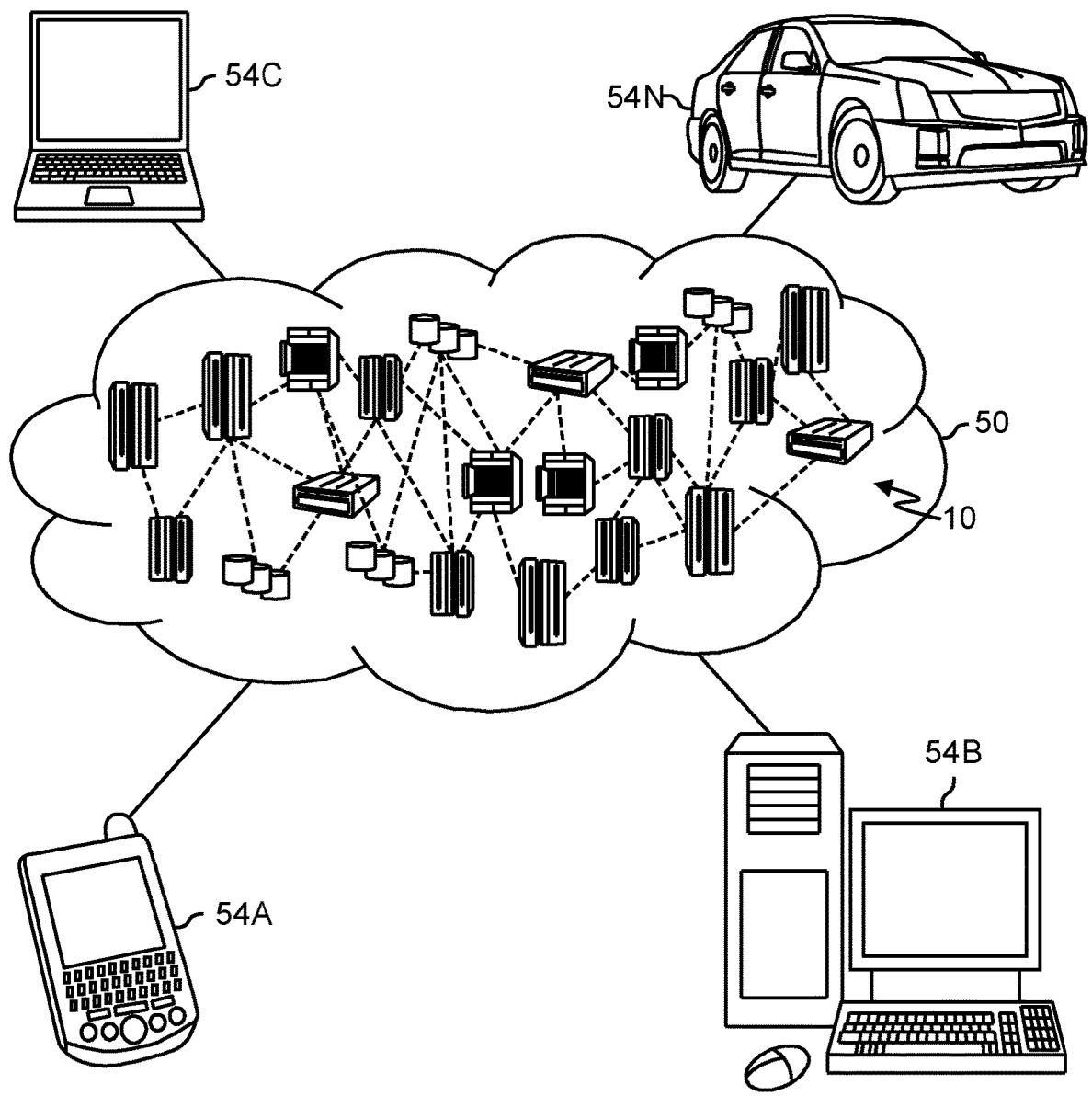
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
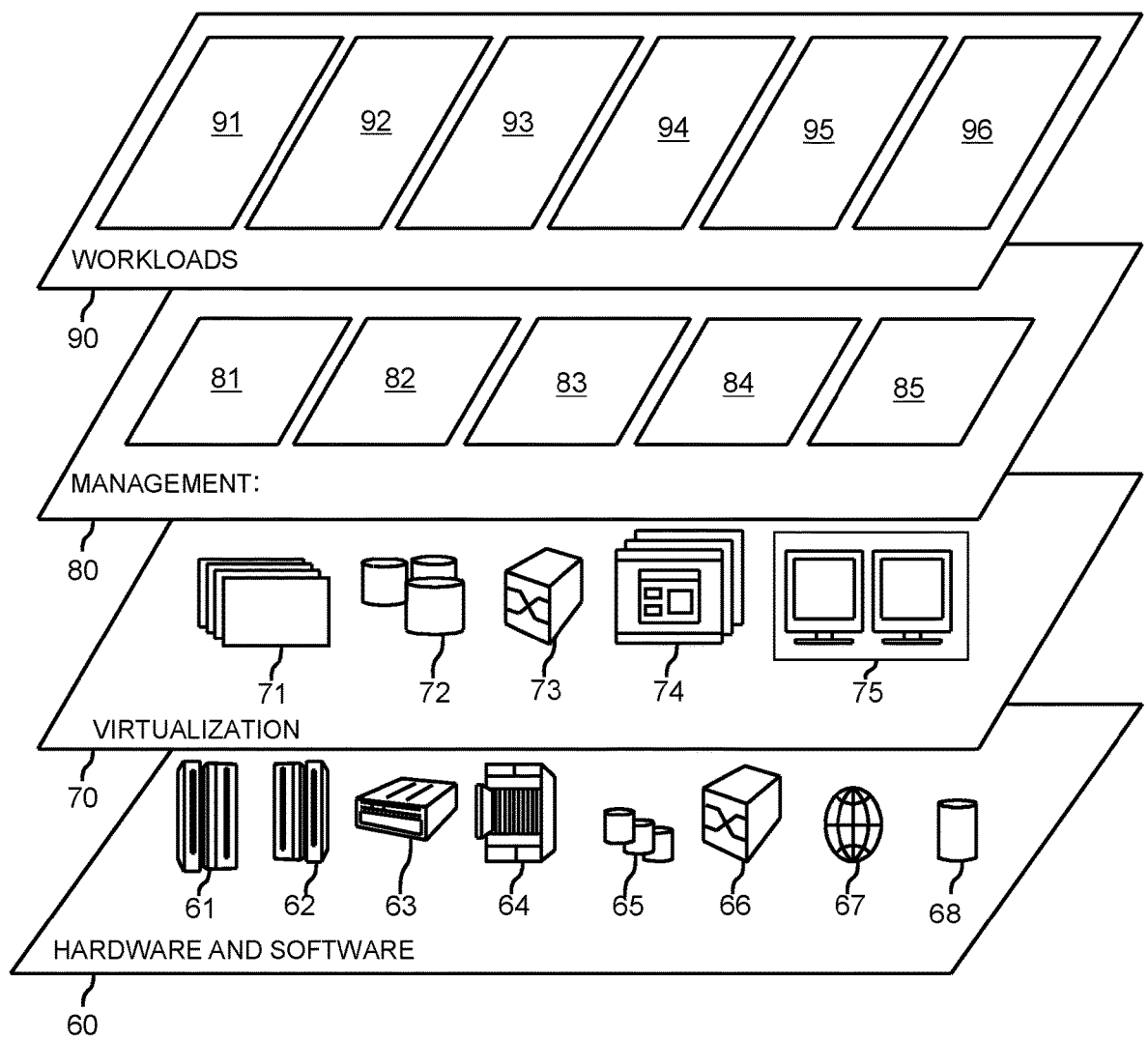
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage controller processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for recycling container storage objects at a storage controller, comprising:
receiving a create operation of a new container by a container orchestrator, comprising information indicating a purpose of the new container;
associating a label with the new container, with the label indicating the container orchestrator defined information;
checking labels of soft-deleted container objects for a suitable match with the associated label of the new container, wherein the soft-deleted container objects are logical objects for deleted containers that are maintained for recycling;
recycling metadata of a matched soft-deleted container object for the new container;
checking received input/output operations for the new container against already stored data of the matched soft-deleted container to recycle data and skip writes where they match; and
if no suitable match of the soft-deleted container is available, creating a new storage object with the associated label indicating the orchestrator-defined information.

2. The method as claimed in claim 1, further comprising:
receiving a delete operation of a container by an orchestrator; and soft-deleting the container by moving a logical object for the container to a recycling store referenced by the label associated when the container was created.

3. The method as claimed in claim 1, further comprising:
when soft-deleting a container, marking data as inaccessible while keeping it valid and referencing it from the metadata of the soft-deleted container object.

4. The method as claimed in claim 1, further comprising:
tracking a version of the container storage object using generational garbage collection metadata.

5. The method as claimed in claim 4, wherein
recycling metadata and data of a matched soft-deleted container object includes resurrecting a logical object including active generational metadata.

6. The method as claimed in claim 4, wherein
checking received input/output operations comprises checking a write hash against stored metadata for a previous generation of the same container:
if a match is found, skipping the data write and updating a generation of an address in the metadata; and,
if no match is found, writing the data and updating the metadata generation.

7. The method as claimed in claim 1, wherein
each label defines a classification of a container and/or an application expected to use the container.

8. The method as claimed in claim 1, wherein
the method may be applied to a defined number of recent generations of the storage object referenced by a common label.

9. The method as claimed in claim 1, further comprising:
providing a higher level of deduplication lookup by looking at storage volumes sharing a same label before checking a deduplication hash database.

10. The method as claimed in claim 1, further comprising:
providing a metadata structure to re-order generations based on the recycling of write data in order to find commonly recycled data.

11. The method as claimed in claim 1, further comprising:
providing a method for selection of soft-deleted containers for actual deletion and garbage collection of soft-deleted logical objects based on a lowest volume recycling metric.

12. A computer system for recycling container storage objects at a storage controller, the computer system comprising:
one or more computer processors, one or more computer-readable storage media, and program instructions stored on the one or more of the computer-readable storage media for execution by at least one of the one or more processors, the program instructions executable by a computing system to cause the computing system to perform a method comprising:
a create operation for receiving a create operation of a new container by a container orchestrator, including information indicating a purpose of the new container;
a labeling component for associating a label with the new container, with the label comprising the container orchestrator defined information;
a label comparing component for checking labels of soft-deleted container objects for a suitable match with the label of the new container, wherein the soft-deleted container objects are logical objects for deleted containers that are maintained for recycling;
a resurrecting component for recycling metadata of a matched soft-deleted container object for the new container;
an incoming input/output handling component for checking received input/output operations for the new container against already stored data of the matched soft-deleted container to recycle data and skip writes where they match; and
if no suitable match of the soft-deleted container is available, creating a new storage object with the associated label indicating the orchestrator-defined information.

13. The system as claimed in claim 12, further comprising:
a delete operation receiving component for receiving a delete operation of a container by an orchestrator and soft-deleting a container by moving a logical object for the container to a recycling store referenced by the label associated when the container was created.

14. The system as claimed in claim 12, further comprising:
a version tracking component for tracking a version of the logical object using generational garbage collection metadata.

15. The system as claimed in claim 14, further comprising:
a generation number defining component for defining a number of recent generations of the logical object referenced by a common label.

16. The system as claimed in claim 12, further comprising:
a duplicate resolution component for providing a higher level of deduplication lookup by looking at storage volumes sharing a same label before checking a deduplication hash database.

17. The system as claimed in claim 12, further comprising:
a soft-delete reordering component for providing a metadata structure to reorder generations based on the recycling of write data in order to find commonly recycled data.

18. The system as claimed in claim 12, further comprising:
a recycling store managing component for selection of soft-deleted containers for actual deletion and garbage collection of soft-deleted logical objects based on a lowest volume recycling metric.

19. A computer program product for recycling container storage objects at a storage controller, the computer program product comprising:
one or more computer-readable storage media and program instructions stored on the one or more non-transitory computer-readable storage media, the program instructions executable by a computing system to cause the computing system to perform a method comprising:
receiving a create operation of a new container by a container orchestrator, comprising information indicating a purpose of the container;
associating a label with the new container, with the label indicating the container orchestrator defined information;
checking labels of soft-deleted container objects for a suitable match with the associated label of the new container, wherein the soft-deleted container objects are logical objects for deleted containers that are maintained for recycling;
recycling metadata of a matched soft-deleted container object for the new container;

checking received input/output operations for the new container against already stored data of the matched soft-deleted container to recycle data and skip writes where they match; and if no suitable match of the soft-deleted container is available, creating a new storage object with the associated label indicating the orchestrator-defined information.

\* \* \* \* \*